(12) United States Patent
Lee et al.

(10) Patent No.: US 7,054,320 B1
(45) Date of Patent: May 30, 2006

(54) APPARATUS AND METHOD FOR PROCESSING AAL2 WHICH SUPPORTS MULTIPLE VIRTUAL CHANNELS IN MOBILE COMMUNICATION SYSTEM

(75) Inventors: Byung Cheon Lee, Kyonggi-do (KR); Sang Jun Choi, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 676 days.

(21) Appl. No.: 09/584,142

(22) Filed: May 31, 2000

(30) Foreign Application Priority Data

| May 31, 1999 | (KR) | ................................ 1999/19832 |
| Sep. 17, 1999 | (KP) | ................................ 1999/40151 |

(51) Int. Cl.
  *H04L 12/28* (2006.01)
(52) U.S. Cl. ............................. 370/395.6; 370/395.64; 370/349; 709/227; 709/230
(58) Field of Classification Search ................ 370/389, 370/392, 393, 395.1, 395.2, 395.6, 395.61, 370/395.64, 395.3, 395.31, 410, 349; 709/225, 709/227, 228, 230
See application file for complete search history.

(56) References Cited

U.S. PATENT DOCUMENTS

| 5,920,559 | A  |   | 7/1999  | Awaji ........................ 370/392 |
| 6,128,659 | A  | * | 10/2000 | Subblah et al. ............. 709/225 |
| 6,366,580 | B1 | * | 4/2002  | Bradley et al. ........... 370/395.2 |
| 6,381,246 | B1 | * | 4/2002  | Constantinof et al. ...... 370/410 |
| 6,449,276 | B1 | * | 9/2002  | Subbiah et al. .......... 370/395.6 |
| 6,483,838 | B1 | * | 11/2002 | Ostman et al. ........ 370/395.31 |
| 6,594,267 | B1 | * | 7/2003  | Dempo .................. 370/395.64 |
| 6,621,821 | B1 | * | 9/2003  | Song ....................... 370/395.6 |
| 2002/0093962 | A1 | * | 7/2002 | Lo et al. .................. 370/395.1 |

* cited by examiner

*Primary Examiner*—Dang Ton
*Assistant Examiner*—Shick Hom
(74) *Attorney, Agent, or Firm*—Fleshner & Kim, LLP

(57) ABSTRACT

An apparatus and method for processing AAL2 supporting multiple virtual channels in a mobile communication system is disclosed. The present invention includes transmitting part including a first memory for storing ATM cells having the same destination according to corresponding destination information, where the transmitting part multiplexes user data items transmitted from a plurality of AAL2 users into one ATM cell according to corresponding destination information and transfers it to the ATM layer; and a receiving part including a second memory for storing mini-cells having destinations by users according to corresponding destination information, where the receiving part demultiplexes each ATM cell transmitted from the ATM layer to deconstruct it into mini-cells by users according to corresponding destinations and transmits them to corresponding AAL2 users. Accordingly, the accommodation capacity of the communication system increases and transmission rate rises, providing stable communication service.

22 Claims, 14 Drawing Sheets

FIG.6

| R-TAG (1-byte) | CPS-PDU (48-byte) |

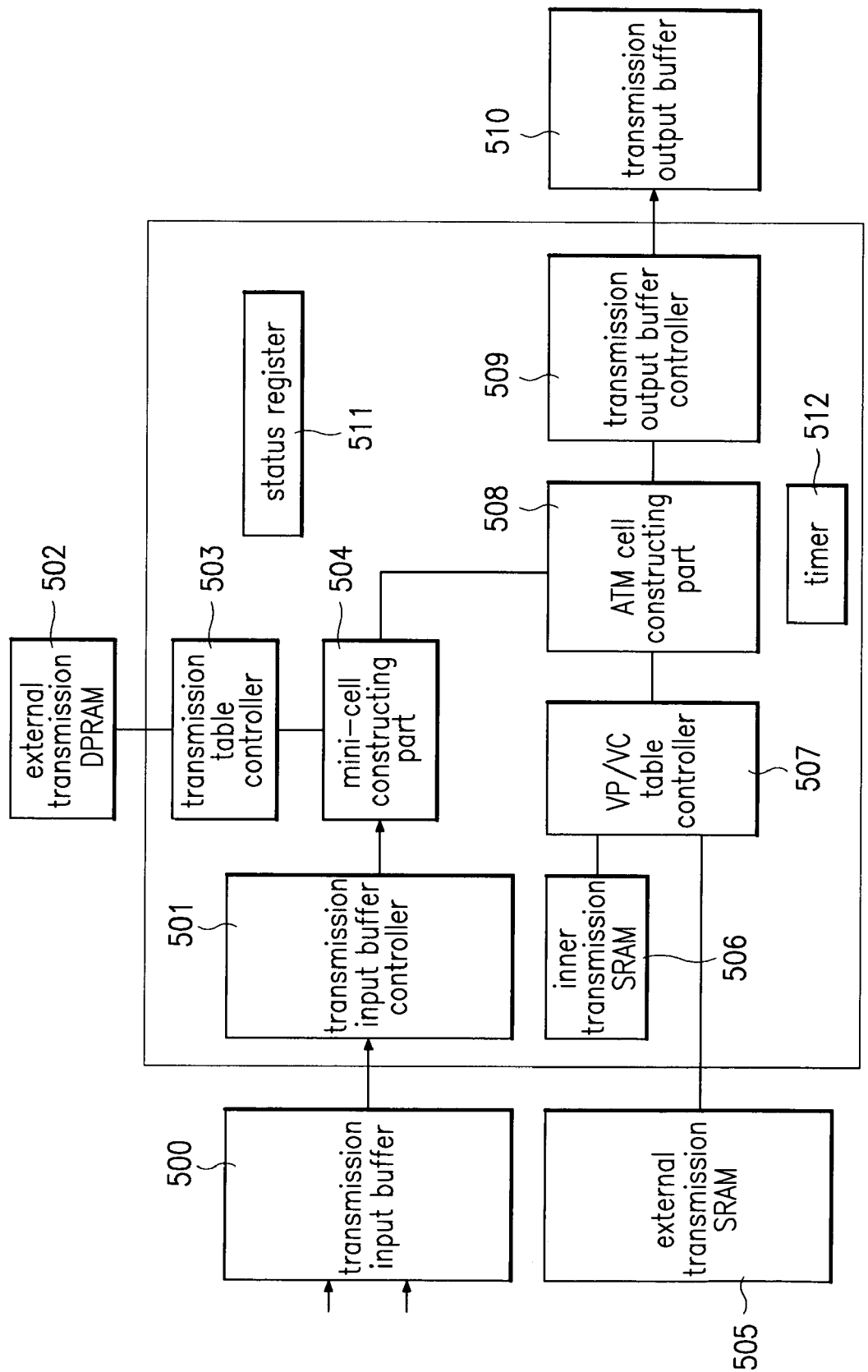

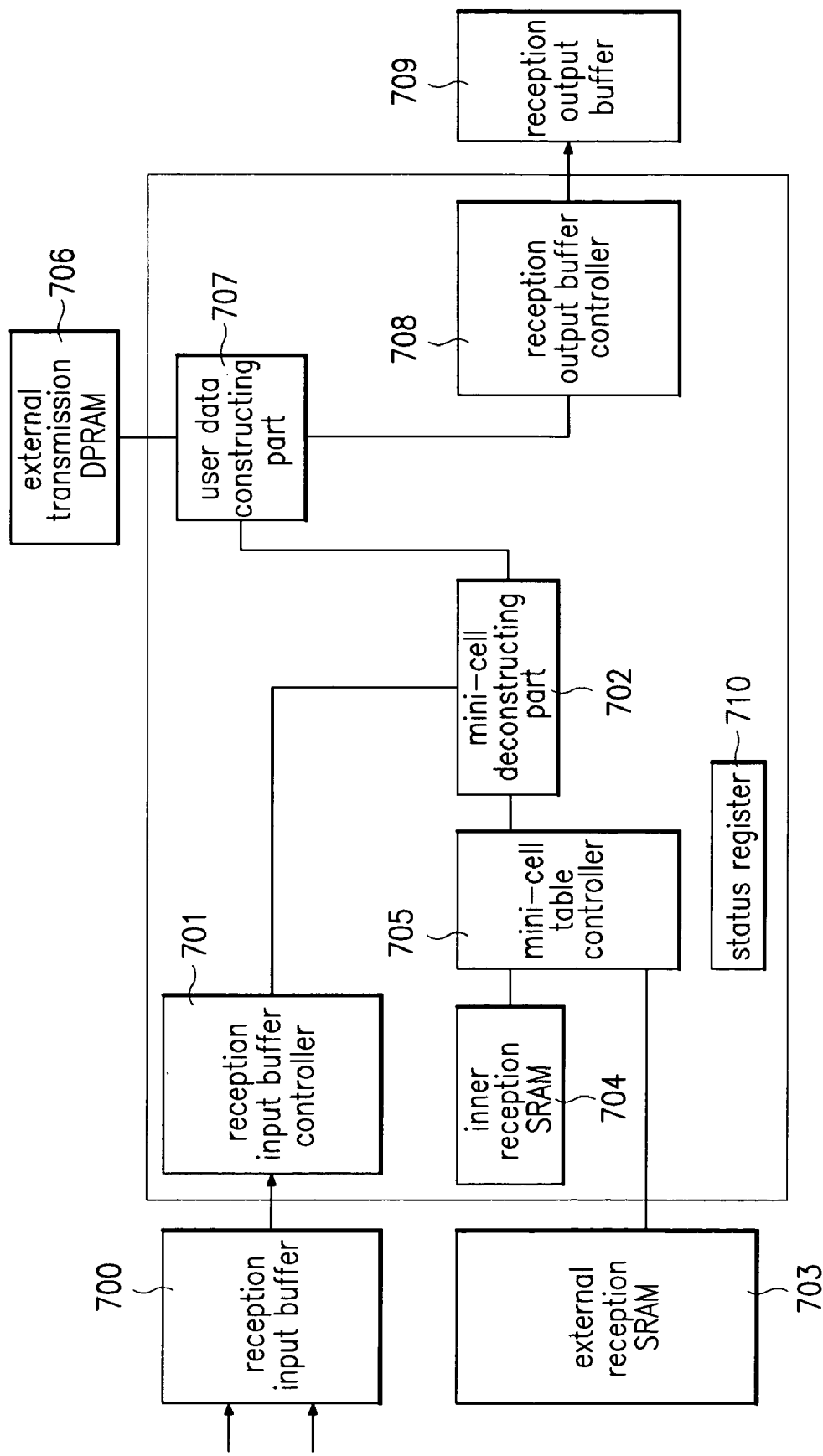

APPARATUS AND METHOD FOR PROCESSING AAL2 WHICH SUPPORTS MULTIPLE VIRTUAL CHANNELS IN MOBILE COMMUNICATION SYSTEM

BACKGROUND OF THE INVENTION

1. Field of the Invention

The present invention relates to a mobile communication system and, more particularly, to an apparatus and method for processing AAL2 which supports multiple virtual channels in a mobile communication system, by which a base station, base station controller and switching center of the mobile communication system can transmit/receive data through the multiple virtual channels using AAL2 protocol.

2. Discussion of Related Art

In general, a base station, base station controller or switching center of a mobile communication system transmits data to a destination using the asynchronous transfer mode (ATM). The ATM is a method by which digital data from a user is divided into cells including address information of the destination and a reception number in the header of each cell to create a predetermined fixed-sized (53-byte) cell. This cell is transferred to the destination. In the ATM, the protocol for data transfer consists of a physical layer, an ATM layer, an ATM adaptation layer (AAL) and an upper layer. Particularly, the AAL which reconstructs user application data, i.e. packet data, transmitted from the upper layer into 48 bytes and is classified into AAL1 to AAL5 referring to ITU-T recommendation I series. The AAL2 protocol provides a variable bit rate for packet data and real-time service.

When a user transmits digital information with a low bit rate using ATM, a portion of ATM cell payload is filled with effective data while the remaining portion is padded with "0" to be transferred to a destination. Accordingly, upon application of ATM to a mobile communication system, data items with a low bit rate, such as voice data, transmitted from multiple mobile stations of a same base station are packed in different cells to be transmitted. This wastes cell payload and generates a delay because packet data from a mobile station is not transmitted due to packet data of a short length from another mobile station being packed into a cell to be transferred. The AAL2 protocol is recommended for the purpose of solving these problems and will be explained below.

FIG. 1 illustrates the structure of AAL2 protocol in the related art. Referring to FIG. 1, the AAL2 protocol is divided into a service specific convergence sublayer (SSCS) and a common part sublayer (CPS). Packet data transmitted from a mobile station which is in the form of service data unit (SDU) enters the AAL2 through the service access point (SAP) of the upper layer (not shown). The AAL2 protocol adds a header and trailer to the SDU in its SSCS to generate Service Specific Convergence Sublayer-Protocol Data Unit (SSCS-PDU). Then, the CPS of the AAL2 protocol adds CPS-header to the CPS-PDS (SSCS-PDU in SSCS) to generate a CPS-packet and adds a start field to the CPS-PDU payload to create a 48-byte CPS-PDU. Here, the CPS-packet corresponds to the CPS-PDU payload. The CPS packets of plural users are multiplexed into the CPS-PDU payload because the CPS-PDU is 48-byte.

The CPS-PDU is transferred to the ATM layer where 5-byte destination information is added to the header of the CPS-PDU to generate a 53-byte ATM cell. As described above, the packet data items received from the mobile stations are multiplexed through the AAL2 protocol to be used as the payload of the ATM cell.

FIG. 2 illustrates the structure of CPS-packet data generated in the AAL2 protocol shown in FIG. 1, and FIG. 3 illustrates the structure of CPS-PDU data generated in the AAL2 protocol shown in FIG. 1. Referring to FIGS. 2 and 3, the CPS-packet consists of a CPS-packet header and a CPS-packet payload. The CPS-packet header includes an 8-bit Channel Identifier (CID) field for identifying multiple users in a single virtual channel (VC); a 6-bit Length Indicator (LI) field for indicating the size of the CPS-packet payload; a User-to-User Indication (UUI) field for identifying SSCS data, CPS user and network manager; and a 5-bit Header Error Control (HEC) field for correcting error in the CPS-packet header. Here, a single virtual channel can accommodate 256 users because the CID field is 8-bit. The CPS-PDU consists of an Offset field (OSF) for indicating the length ranging from the starting point of the CPS-PDU payload to the starting point of the next CPS-packet, a start field including a sequence number (SN) and a parity bit (P), a payload (CPS-INFO), and padding field (PAD).

The AAL2 protocol can multiplex packet data items with a short length sent from multiple users on the ATM network into one cell to transmit it. Accordingly, the period of time required for packing every short user data in a new cell can be reduced and the bandwidth of the ATM network can be effectively used. In the conventional AAL2 protocol, however, though transmission of packet data to a destination through a single virtual channel has been supported by the standard recommendation, there has not been a standard recommendation for transmission of packet data (or cell) through multiple virtual channels. Accordingly, it is impossible for multiple mobile stations, base stations or switching centers in a mobile communication system using the AAL2 protocol to transmit packet data through multiple virtual channel, generating a limit in the accommodation capacity for users and the transmission rate. For this reason, there has been a request for standardization for AAL2 protocol supporting multiple virtual channels in the mobile communication system.

SUMMARY OF THE INVENTION

An object of the present invention is to solve at least the problems and disadvantages of the related art.

An object of the present invention is to provide an apparatus and method for processing AAL2 supporting multiple virtual channels of a base station, base station controller or mobile switching center in a mobile communication system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for processing AAL2 supporting multiple virtual channels includes a transmitting part including a first memory for storing ATM cells having the same destination according to corresponding destination information, the transmitting part multiplexing user data items transmitted from a plurality of AAL2 users into one ATM cell according to corresponding destination information and transferring it to the ATM layer; and a receiving part including a second memory for storing mini-cells having destinations by users according to corresponding destination information, the receiving part demultiplexing each ATM cell transmitted from the ATM layer to deconstruct it into mini-cells by users according to corresponding destinations and transmitting them to corresponding AAL2 users.

According to another aspect of the present invention to accomplish the object, an apparatus for processing AAL2 supporting multiple virtual channels comprises: a channel identifier memory for storing channel identifier information for identifying users of packet data items sent from multiple AAL2 users, or storing channel identifier information for identifying users of ATM cells sent from ATM layer; a virtual channel identification information (R_Tag) memory for storing identification information (R_Tag) for identifying virtual channels according to destinations of the packet data items, or identification information (R_Tag) for identifying virtual channels according to destinations of the ATM cells; a transmitter/receiver for multiplexing the packet data items using the channel identifier information and identification information (R_Tag) to transmit it to the ATM layer by virtual channels, or transferring protocol data demultiplexed by virtual channels to corresponding AAL2 users; and a plurality of buffers for storing the packet data items transmitted from the transmitter by virtual channels, or storing the ATM cells transferred from the ATM layer by virtual channels.

According to another aspect of the present invention to accomplish the object, a method for processing AAL2 supporting multiple virtual channels comprises the steps of: multiplexing packet data transmitted from at least one AAL2 user, to generate protocol data; assigning virtual channel identification information (R_Tag), set by destinations, to the protocol data; and transmitting the protocol data through corresponding virtual channel according to the assigned identification information (R_Tag).

BRIEF DESCRIPTION OF THE ATTACHED DRAWINGS

The invention will be described in detail with reference to the following drawings in which like reference numerals refer to like elements wherein:

FIG. 6 shows the structure of CPS-PDU output from the AAL2 transmitter shown in FIG. 5;

FIG. 7 is a block diagram of the transmitting part of an AAL2 processing apparatus according to a second embodiment of the AAL2 processing apparatus of the present invention shown in FIG. 4;

FIG. 9 is a block diagram of the AAL2 receiving part shown in FIG. 4;

DETAILED DESCRIPTION OF PREFERRED EMBODIMENT

Reference will now be made in detail to the preferred embodiments of the present invention, examples of which are illustrated in the accompanying drawings.

The present invention proposes an AAL2 processing apparatus which is included in each of a base station BTS, a base station controller BSC and a mobile switching center MSC of a mobile communication system, to transmit data items sent from a plurality of mobile stations through multiple virtual paths/channels to corresponding destinations.

Figure 1:
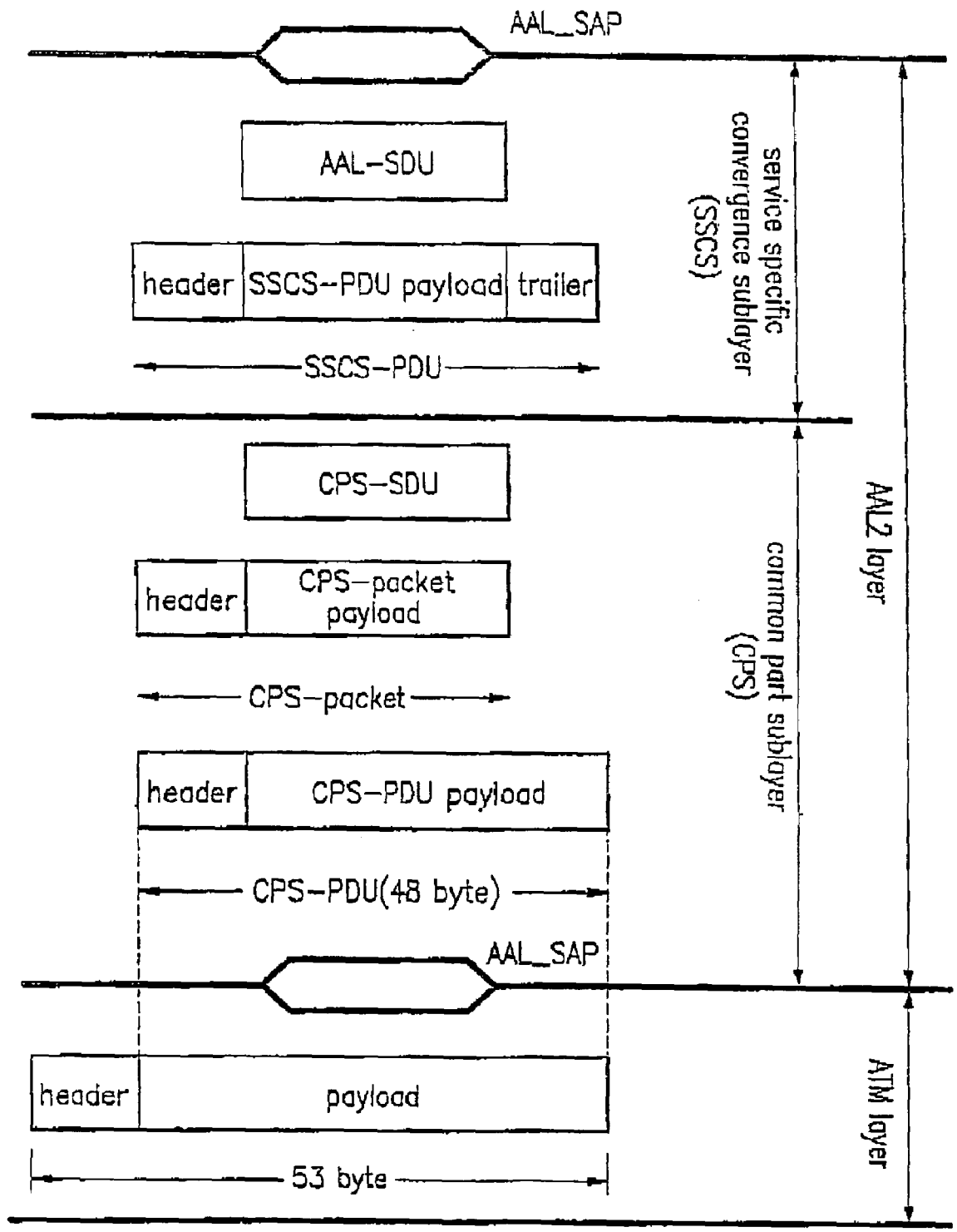
FIG. 1 is a diagram for explaining the structure of the conventional AAL2 protocol recommended by ITU-T.
Figure 2:
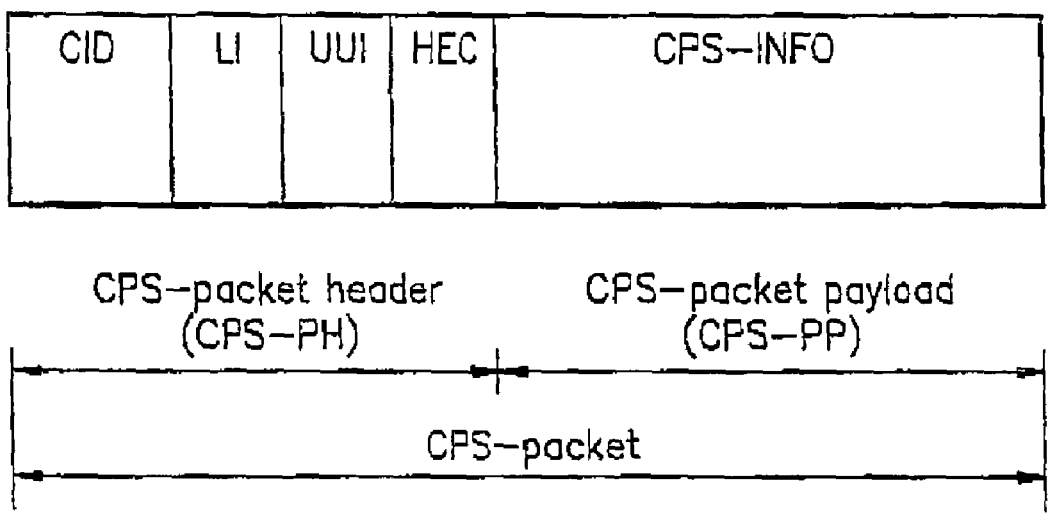
FIG. 2 shows the structure of CPS-packet data generated in the AAL2 protocol shown in FIG. 1.
Figure 3:
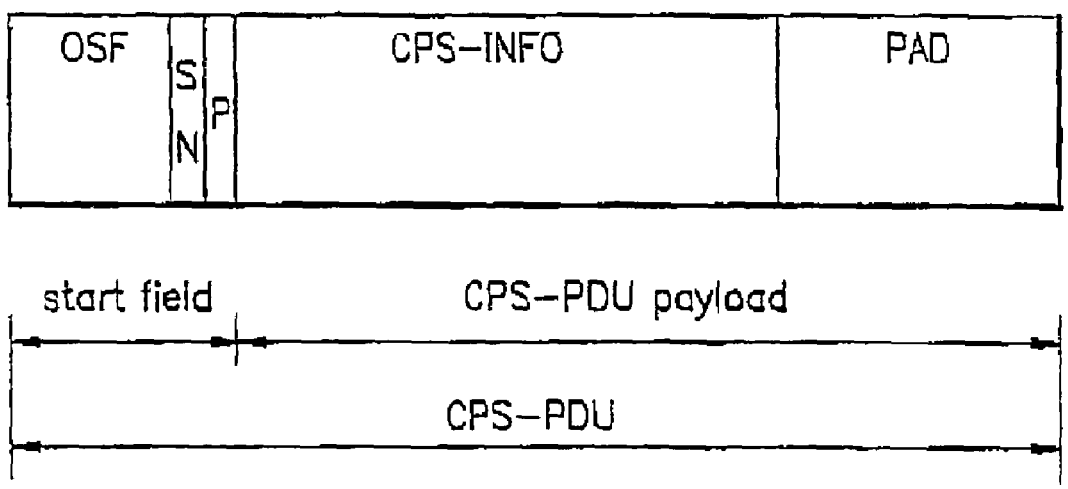
FIG. 3 shows the data structure of CPS-PDU generated in the AAL2 protocol shown in FIG. 1.
Figure 4:
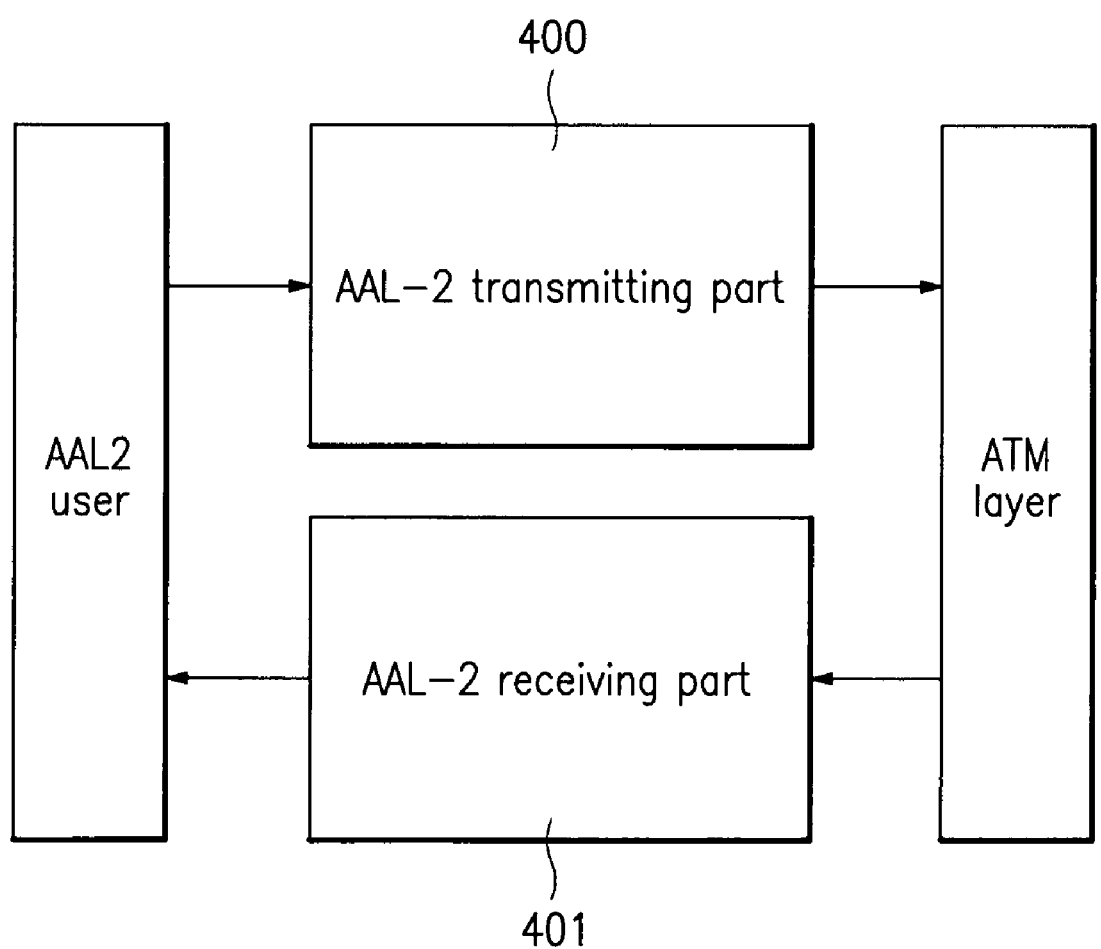
FIG. 4 is a block diagram of an AAL2 processing apparatus according to the present invention.

FIG. 4 is a block diagram of the AAL2 processing apparatus according to the present invention. Referring to FIG. 4, the AAL2 processing apparatus includes: an AAL2 transmitting part 400 for multiplexing packet data sent from each of plural AAL2 users into one ATM cell according to corresponding destination information to transmit it; and an AAL2 receiving part 401 for receiving the ATM cell of a fixed size from ATM layer, demultiplexing it by users according to corresponding destinations and then transmitting them to corresponding AAL2 users. The AAL2 processing apparatus constructed as above is included in each of the base station BTS, base station controller BSC and mobile switching center MSC.

When the AAL2 processing apparatus is in the base station BTS, the AAL2 user receives data from a plurality of mobile stations and the data is transmitted through the ATM layer to the base station controller BSC. When the AAL2 processing apparatus is in the base station controller BSC, the AAL2 user may receive data from the base station BTS and then transmit the data through the ATM layer to the mobile switching center MSC, or the AAL2 user may receive data from the mobile switching center MSC and then transmit the data through the ATM layer to the base station BTS. Accordingly, the base station, base station controller or mobile switching center using the AAL2 protocol according to the present invention can transfer packet data (or cell) to a corresponding destination using multiple virtual channels.

Figure 5:
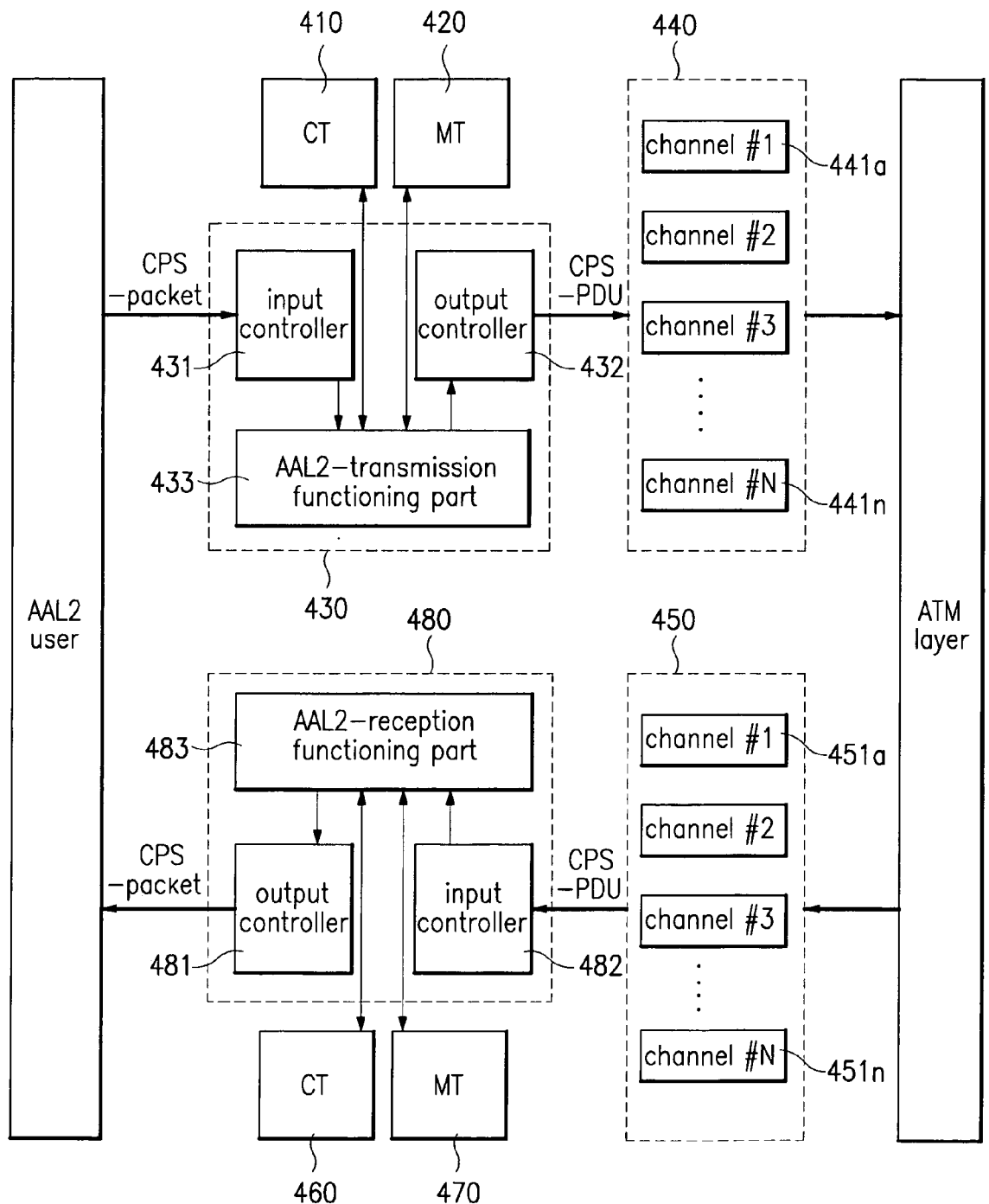
FIG. 5 is a block diagram of an AAL2 processing apparatus supporting multiple virtual channels according to a first embodiment of the AAL2 processing apparatus of the present invention shown in FIG. 4.

FIG. 5 is a block diagram of an AAL2 processing apparatus supporting multiple virtual channels according to a first embodiment of the present invention. Referring to FIG. 5, the AAL2 processing apparatus includes: an AAL2 transmitter 430 for converting packet data items received from a plurality of AAL2 users into CPS-packets and multiplexing them to generate a 49-byte CPS-PDU, and routing virtual channels according to destinations to transmit the CPS-PDU; an AAL2 receiver 480 for demultiplexing the 49-byte CPS-PDU received from the ATM layer to generate the CPS-packets and transmitting the generated CPS-packets to AAL2 users corresponding to destinations; CID Tables CTs 410 and 460 each of which stores CID information assigned to the CPS-packet when a call is set up in order to support multiple virtual channels; Multiple VC Tables MTs 420 and 470 each of which stores R_Tag information for identifying a virtual channel set to corresponding destination of CPS-PDU; a transmission buffer 440 for storing the CPS-PDU transmitted from the AAL2 transmitter 430 by virtual channels; and a reception buffer 450 for storing CPS-PDU transmitted from the ATM layer by virtual channels.

Here, the AAL2 transmitter 430 includes an input FIFO controller 431 for receiving the CPS-packets transmitted from the AAL2 users and an output FIFO controller 432 for controlling the transmission buffer 440 to transmit the CPS-PDU by multiple virtual channels. The AAL2 receiver 480 also includes an input FIFO controller 482 for receiving the CPS-PDU transmitted through the reception buffer 450 from the ATM layer and an output FIFO controller 481 for transferring the CPS-packets output from the AAL2 receiver 480 to corresponding AAL2 users. Furthermore, each of the CTs 410 and 460 and MTs 420 and 470 respectively stores CID information and R_Tag information using a Dual Port RAM (DPRAM). Each of the transmission buffer 440 and reception buffer 450 is configured of a FIFO or SRAM. The operation of the AAL2 protocol supporting multiple virtual channels in the mobile communication system as constructed above will be explained below.

The operation in case where AAL2 users (mobile stations) transmit packet data items is first described. The packet data items sent from the AAL2 users are converted into CPS-packets in the CPS of the AAL2 protocol to enter the AAL2 transmitter 430. Here, the CPS-packets are input into the AAL2 transmitter 430 through the input controller 431. The AAL2 transmitter 430 assigns 8-bit CID information for identifying the packet data users to the CPS-packets. Subsequently, the AAL2 transmitter 430 sequentially assigns 6-bit Length Indicator (LI) information; User-to-User Indication (UUI) information for identifying SSCS data, CPS user, network manager; and 5-bit Header Error Control (HEC) information for correcting error in the CPS-packet header to each CPS-packet data. This is performed by an AAL2 transmission functioning part 433 included in the AAL2 transmitter 430.

Each CPS-packet data to which the CID information, LI information, UUI information and HEC information are assigned becomes a Protocol Data Unit (CPS-PDU). The AAL2 transmitter 430 assigns information for identifying a virtual channel set to corresponding destination, i.e. R_Tag stored in the MT 420, to the generated CPS-PDU. The R_Tag is preferably one byte. The R_Tag provided by the MT 420 is information for assigning virtual path identifier (VPI) and virtual channel identifier (VCI) for routing the 53-byte cell generated by using the CPS-PDU as the payload in ATM layer to a corresponding destination.

Subsequently, the AAL2 transmitter 430 assigns Offset field (OSF) indicating the length ranging from the starting point of the CPS-PDU payload to the starting point of the next CPS-packet, a sequence number (SN) and a parity bit (P) to the CPS-PDU, to generate a 48-byte CPS-PDU. The 48-byte CPS-PDU and one-byte R_Tag for information required for assignment of virtual paths/virtual channels of AAL2 become forty-nine bytes to be routed through the output controller 432 to the R_Tag virtual channels. Here, each virtual channel set to corresponding destination includes the transmission buffer 441a to 441n to store the CPS-PDU in the transmission buffer 440 included in corresponding virtual channel. That is, since the transmission buffer 441a to 441n is assigned to each virtual channel, the CPS-PDU can be output to the transmission buffer 441a to 441n included in corresponding virtual channel according to the R_Tag provided by MT 420.

The 48-byte CPS-PDU and one-byte R_Tag sent to the transmission buffer 440 add the header including the virtual path identifier (VPI) and virtual channel identifier (VCI) thereto in the ATM layer, to be reconstructed as an ATM cell. This ATM cell is transmitted through multiple virtual channels set to corresponding destinations. As described above, the base station, base station controller or mobile switching center to which the AAL2 protocol of the present invention is applied can transfer the cell to corresponding switching center (or destination) through the multiple virtual channels set to the destinations. Preferably, 256 virtual channels can be set because the CID allocated to the CPS-PDU is 8-bit so that 256 users can be identified.

There will be described below the operation of the apparatus of processing the AAL2 protocol supporting multiple virtual channels in case where a cell is transferred through multiple virtual channels from the ATM layer to the AAL2 users. Each cell, transmitted through the multiple virtual channels from the base station to the base station controller or from the base station controller to the base station, is divided into 49-byte data including CPS-PDU and R_Tag through the ATM layer to be stored in plural reception buffers 451a to 451n included in the virtual channels, respectively.

Subsequently, the 48-byte CPS-PDU enters the AAL2 receiver 480 through the input controller 482 controlling the reception buffers 451a to 451n. The AAL2 reception functioning part 483 divides the multiple virtual channels through which the CPS-PDU has been transmitted according to destinations using the R_Tag stored in the MT 470, and classifies the CPS-packets by users in the CPS-PDU transmitted through one virtual channel using the CID stored in the CT 460. That is, the AAL2 receiver 480 demultiplexes the CPS-PDU to generate the CPS-packets in order to transmit it by destinations. After the demultiplexing, the packet data items generated in the AAL2 receiver 480 are transferred to the AAL2 users corresponding to the destinations.

Figure 6:
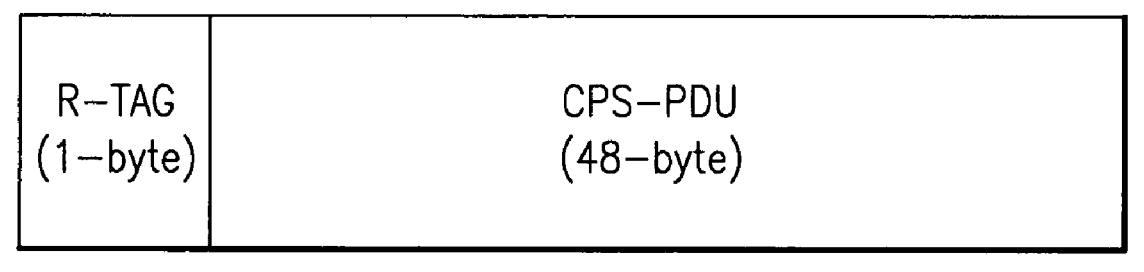

FIG. 6 illustrates the structure of the CPS-PDU and R_Tag output from the AAL2 transmitter shown in FIG. 5. Referring to FIG. 6, the CPS-PDU generated in the AAL2 transmitter corresponds to 48-byte payload plus one-byte R_Tag added thereto. Here, the R_Tag is information for identifying multiple virtual channels, and the payload corresponds to the CPS-PDU generated by the AAL2 transmitter.

FIG. 7 is a block diagram of the transmitting part of an AAL2 processing apparatus according to a second embodiment of the present invention.

Referring to FIG. 7, the AAL2 transmitter includes a transmission input buffer 500 for storing AAL2 user data items transmitted from a plurality of AAL2 users; a transmission input buffer controller 501 for reading the user data items stored in the transmission input buffer 500; a transmission table controller 503 for controlling a table storing virtual path/channel information and channel identifier (CID) information according to the routing information (R_Tag) included in the user data items transmitted; a mini-cell constructing part 504 for combining the channel identifier information with the user data items to generate mini-cells; an ATM cell constructing part 508 for multiplexing each mini-cell generated by the mini-cell constructing part 504 into the payload of each ATM cell according to the virtual path/channel information, to generate an ATM cell;

an external transmission SRAM 505 for, when mini-cells having different virtual path/channel information items from each other are constructed, temporarily storing an ATM cell which is not completely constructed; an inner transmission SRAM 506 for storing a table storing address information of each ATM cell stored in the external transmission SRAM 505; a virtual path/channel table controller 507 for controlling input/output of each ATM cell stored in the external transmission SRAM 505 according to the address information of each ATM cell stored in the inner transmission SR 506; a transmission output buffer 510 for storing each ATM cell generated by the ATM cell constructing part 508; a transmission output buffer controller 509 for controlling the transmission output buffer 510; a timer 512 for outputting ATM cells generated by the ATM cell constructing part 508 at a predetermined time interval; and a status register 511 for managing the status of each portion of the AAL2 transmitting part and storing operation parameters for control. The operation of the AAL2 transmitter constructed as above will be explained below.

Figure 11A:
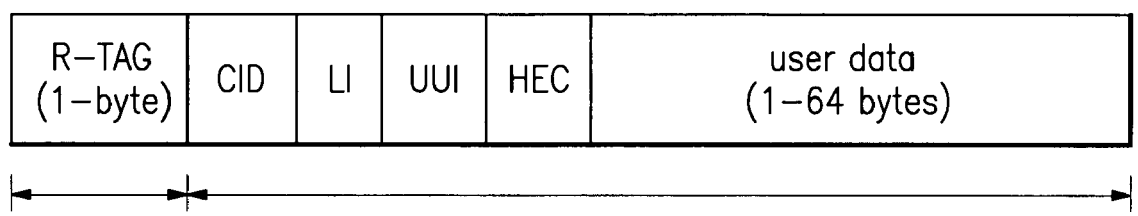
FIG. 11A shows ANP data.
Figure 11B:
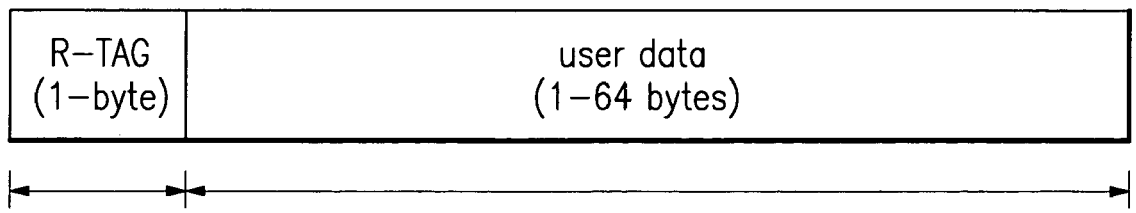
FIG. 11B shows user data.

First of all, each of AAL2 user data items transmitted from plural AAL2 users are divided into AAL2 Negotiation Procedures (ANP) data and user data. Here, the user data means voice packet data transmitted from each mobile station and the ANP data means control data for controlling the voice packet data. The ANP data and user data are shown in FIGS. 11A and 11B. Referring to FIG. 11A, the ANP data consists of an one-byte routing (R_Tag) field, a channel identifier (CID) field for identifying plural users, a length indicator (LI) field, a user-to-user indication (UUI) field for identifying a network manager, a header error control (HEC) field for correcting error in the user data, and a user data field of one to 64 bytes. Referring to FIG. 11B, the user data consists of one-byte routing (R_Tag) field, and a user data field of one to 64-byte.

Upon transmission of the user data and ANP data from plural AAL2 users, each user data which is voice packet data and ANP data which is a control signal are stored in the transmission input buffer 500, to be output under the control of the transmission input buffer controller 501.

When the ANP data is output from the transmission input buffer 500, the ANP data obtains virtual path/channel information corresponding to routing information (R_Tag) thereof with reference to the external transmission DPRAM 502, and then is directly transmitted to the ATM cell constructing part 508 without passing through the mini-cell constructing part 504. Then, the ATM cell constructing part 508 multiplexes each ANP data transmitted into the payload of ATM cell, to generate an ATM cell according to each virtual path/channel.

On the other hand, when the user data is output from the transmission input buffer 500, the user data assigns channel identifier information (CID) corresponding to its routing information (R_Tag) thereto with reference to the external transmission DPRAM 502, obtains virtual path/channel information, and then is transmitted to the mini-cell constructing part 504. Here, the channel identifier information and virtual path/channel information according to the routing information (R_Tag) of the user data and ANP data are stored in the external transmission DPRAM 502 which outputs channel identifier information (CID) and virtual path/channel information under the control of the transmission table controller 503. The routing information included in the user data and ANP data is used as an identification address of the channel identifier information and virtual path/channel information stored in the external transmission DPRAM 502.

Upon reception of the user data, the mini-cell constructing part 504 generates each mini-cell using the user data, channel identifier information (CID) and virtual path/channel information obtained from the external transmission DPRAM 502. Subsequently, mini-cells generated by the mini-cell constructing part 504 are sent to the ATM cell constructing part 508 where they are multiplexed into the payload of the ATM cell having the same virtual path/channel information, to generate ATM cells.

Figure 12:
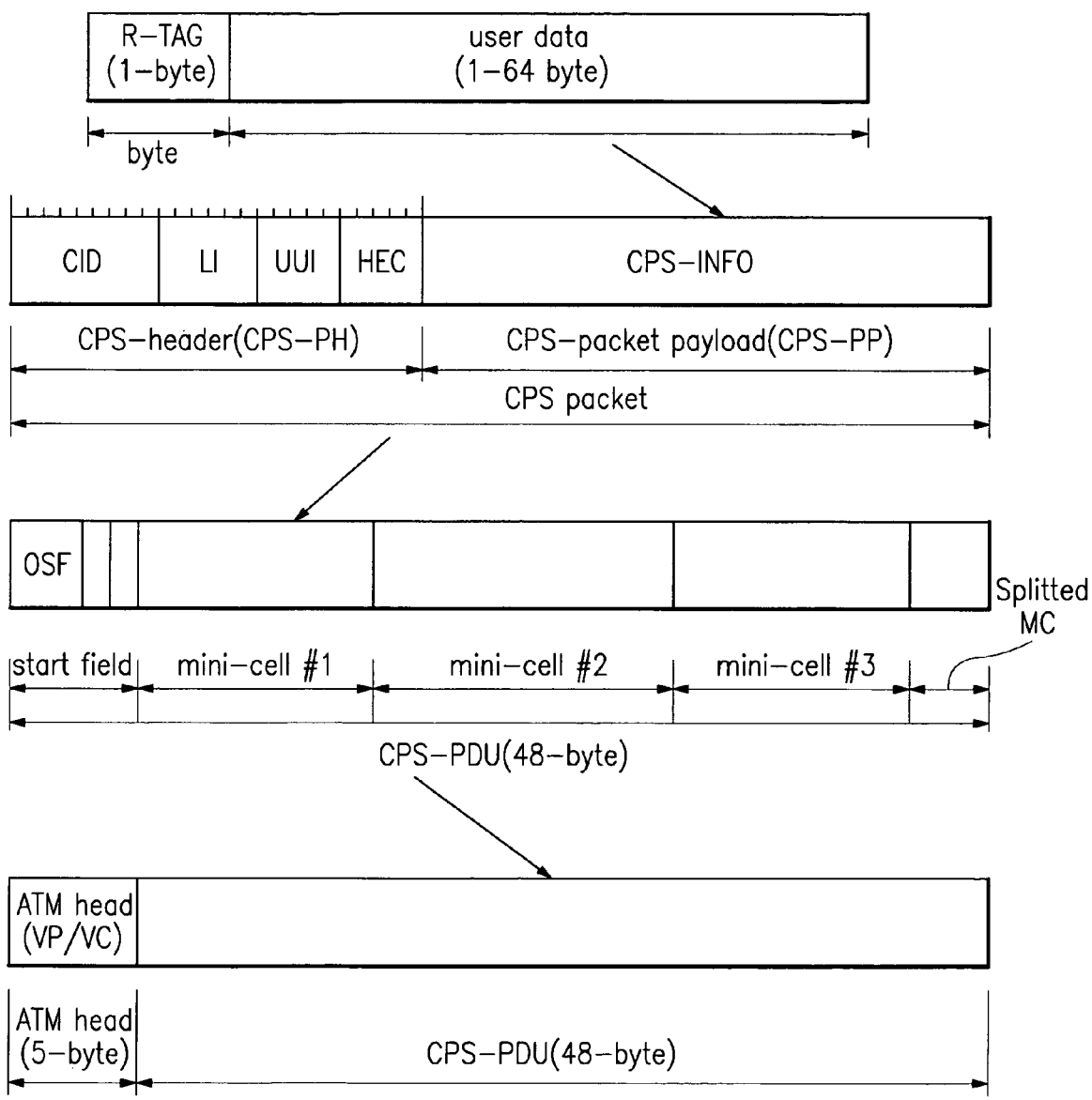
FIG. 12 shows a procedure of multiplexing of a mini-cell of each user into the payload of ATM cell.

The ATM cell constructing part 508 multiplexes the transmitted mini-cells into the payload of the ATM cell as shown in FIG. 12. Namely, a timer 512 corresponding to the ATM cell is started and the ATM cell constructing part 508 inserts mini-cells into the payload of the ATM cell until it fills up. When one 53-byte ATM cell is completed, the complete ATM cell is transferred to the transmission output buffer 510. Specifically, the mini-cells are multiplexed until the 48-byte CPS-PDU fills up, to generate the ATM cell to which the 48-byte CPS-PDU and 5-byte virtual path/channel information are assigned.

If prior to completing an ATM cell of mini-cells having specific virtual path/channel information (for example, virtual path/channel information is 2/3), a mini-cell having different virtual path/channel information (for example, virtual path/channel information is 3/7) enters the ATM cell constructing part 508, the ATM cell constructing part 508 stores the incomplete ATM cells (that is, the ATM cell with virtual path/channel information of 2/3) in the external transmission SRAM 505 together with related parameter values. The incomplete ATM cell with the virtual path/channel information of 2/3 is stored until either a time set by the timer 512 runs out or until more mini-cells of the same virtual path/channel is received.

Also, the address information of the incomplete ATM cells stored in the external transmission SRAM 505 is stored in the table of the inner transmission SRAM 506. The address information stored in the inner transmission SRAM 506 is shown in FIG. 8B, and the parameter values stored in the external transmission SRAM 505 is shown in FIG. 8C.

Figure 8A:
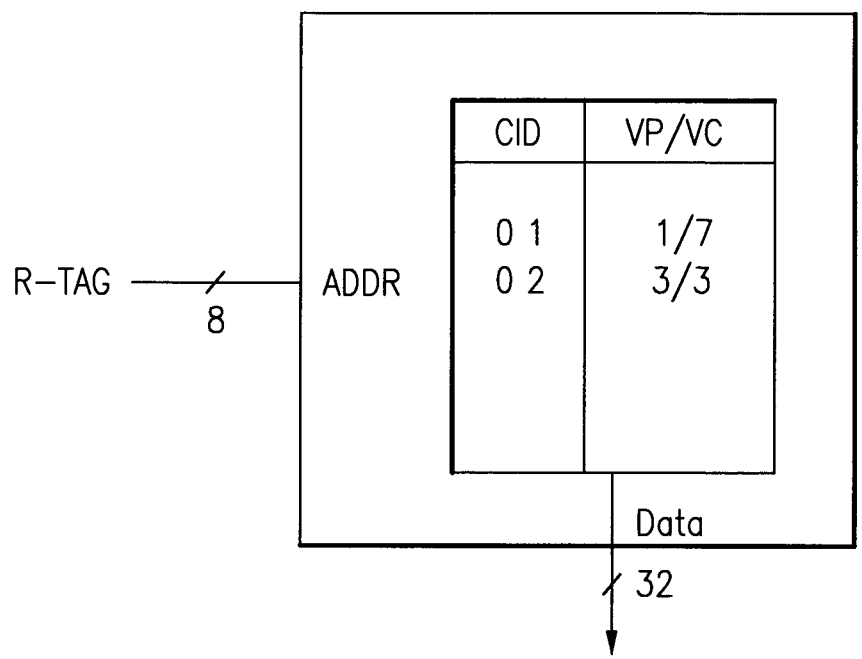
FIG. 8A is a diagram for explaining the external transmission DPRAM shown in FIG. 7.
Figure 8B:
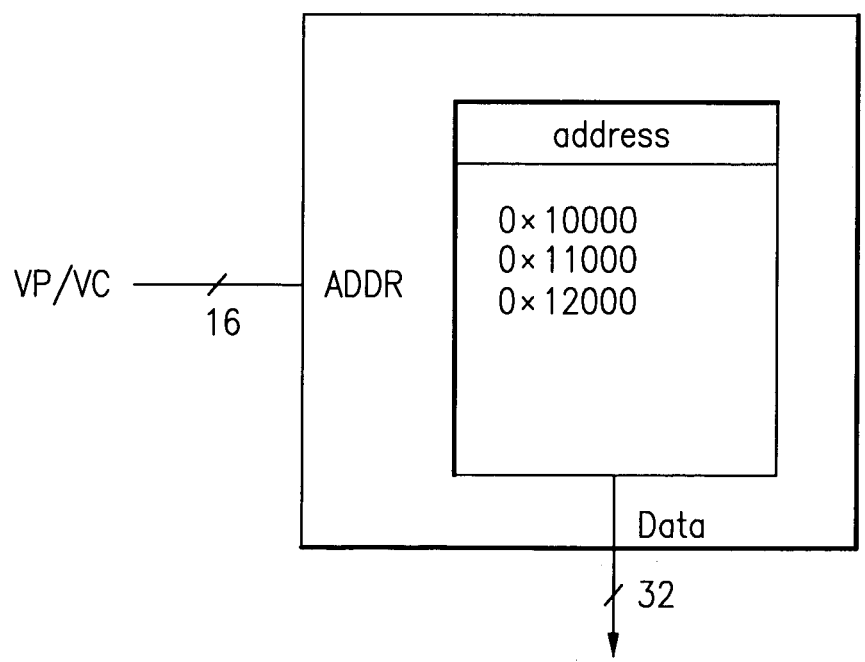
FIG. 8B is a diagram for explaining the inner transmission SRAM shown in FIG. 7.
Figure 8C:
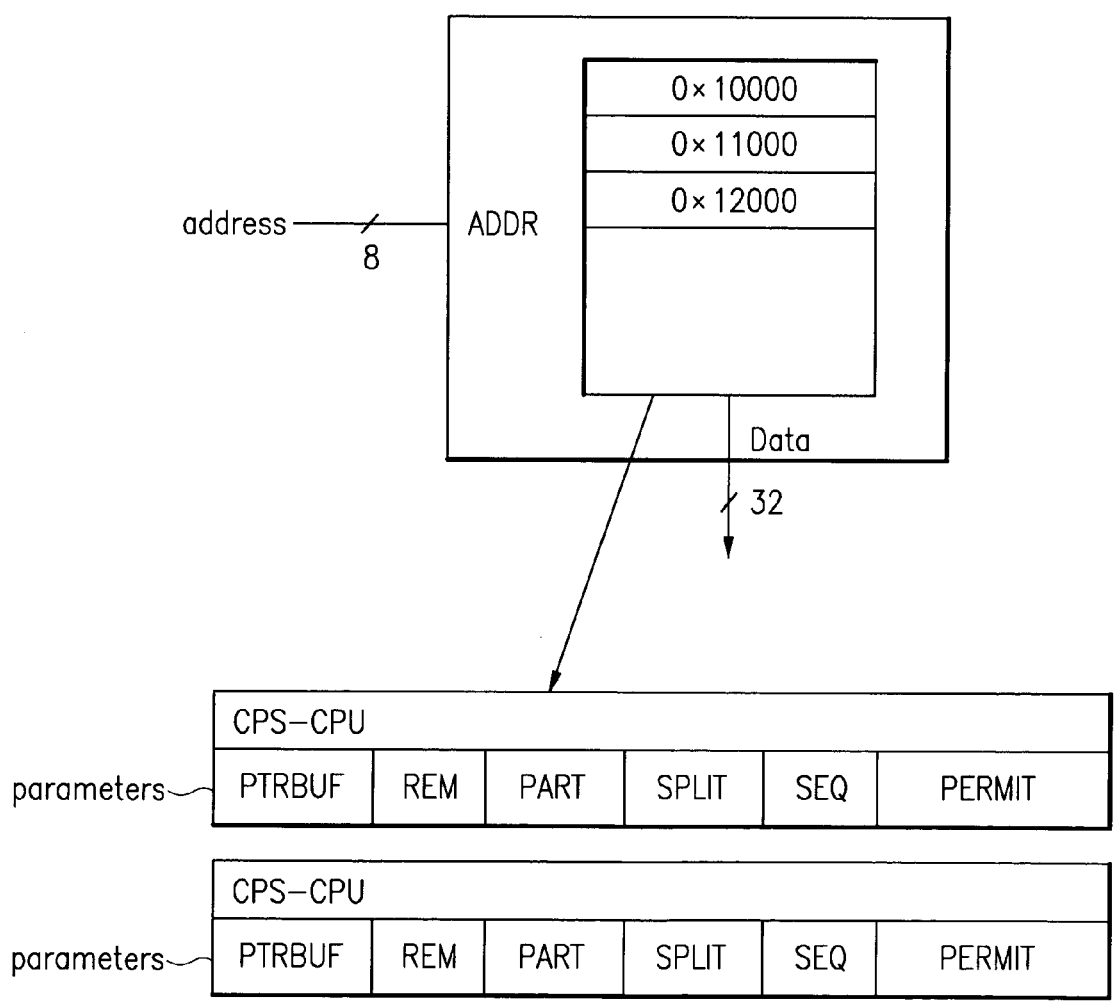
FIG. 8C is a diagram for explaining the external transmission SRAM shown in FIG. 7.
Figure 10A:
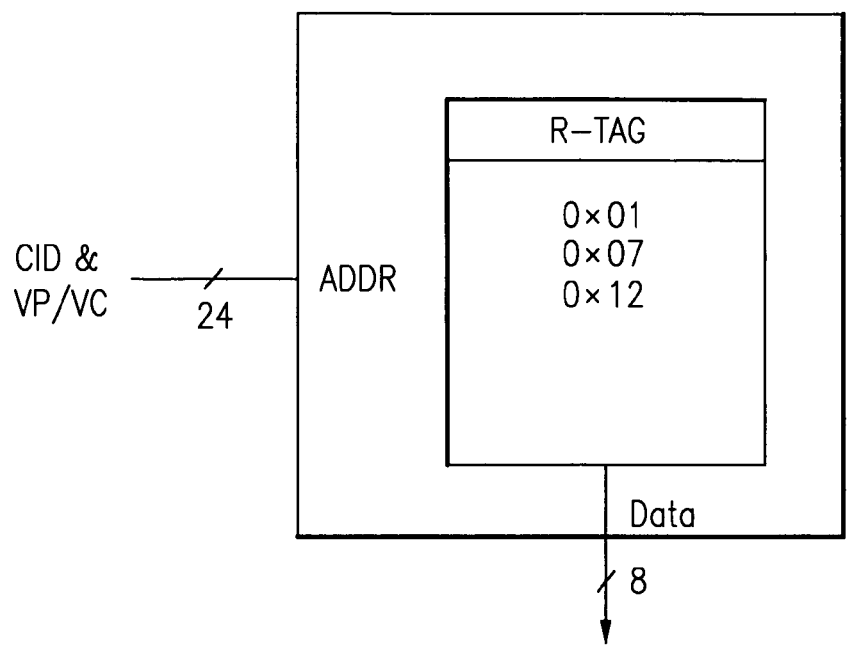
FIG. 10A is a diagram for explaining the external reception DPRAM shown in FIG. 9.
Figure 10B:
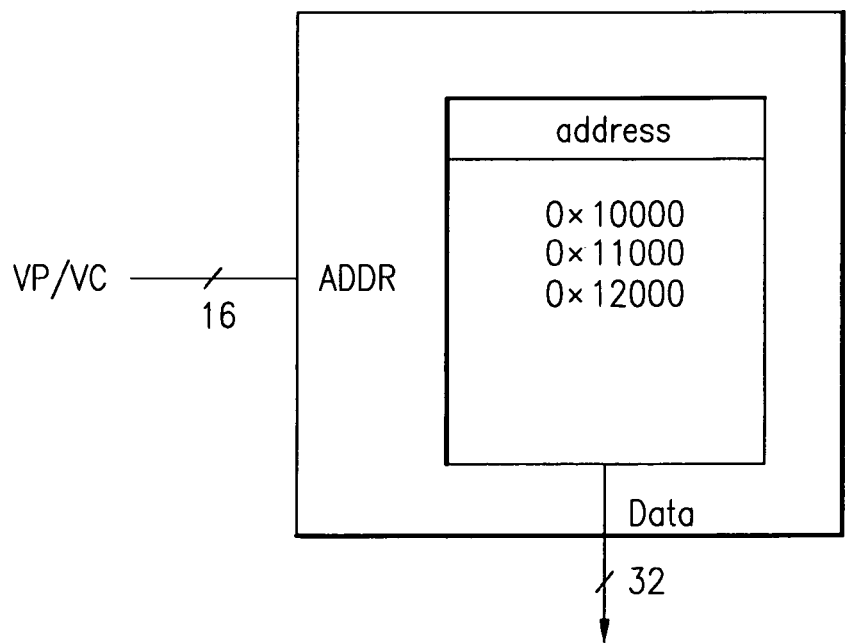
FIG. 10B is a diagram for explaining the inner reception SRAM shown in FIG. 9.
Figure 10C:
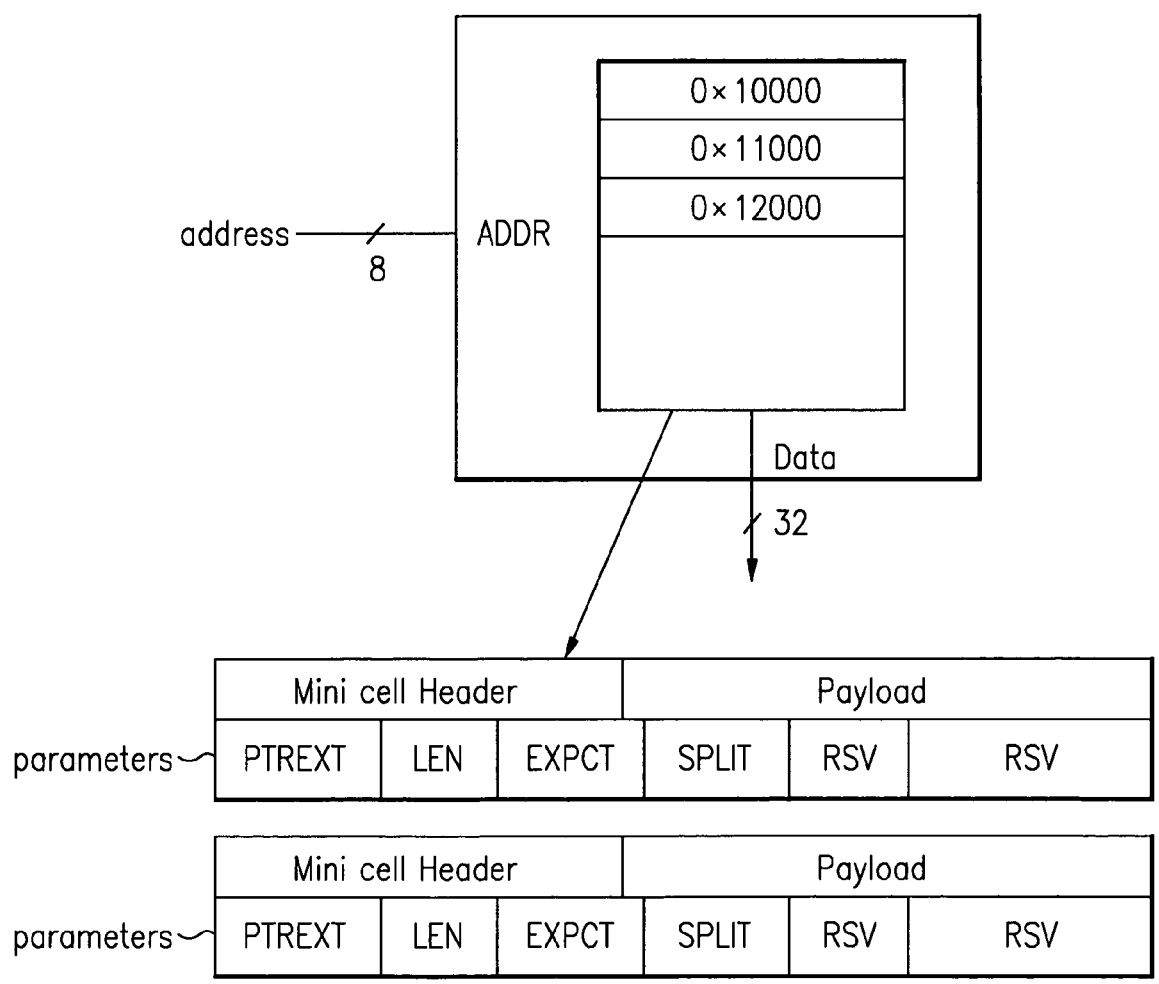
FIG. 10C is a diagram for explaining the external reception SRAM shown in FIG. 9.

Referring to FIG. 8B, the inner transmission SRAM 506 stores the address information of incomplete ATM cells stored in the external transmission SRAM 505. The external transmission SRAM 505 stores the incomplete ATM cells in addresses determined according to virtual path/channel information thereof. Accordingly, the inner transmission SRAM 506 stores the address of the external transmission SRAM 505, determined according to virtual path/channel information of each of incomplete ATM cells. Referring to FIG. 8C, it can be known that the external transmission SRAM 505 stores incomplete ATM cells according to the addresses stored in the inner transmission SRAM 506.

When other mini-cells having different virtual path/channel information (that is, virtual path/channel information is 3/7) are input, the ATM cell constructing part 508 searches the table stored in the inner transmission SRAM 506. Here, when the external transmission SRAM 505 is storing an incomplete ATM cell for the different virtual path/channel information (that is, virtual path/channel information is 3/7), the ATM cell constructing part 508 reads the incomplete ATM cell with virtual path/channel information of 3/7 and related parameter values from the external transmission SRAM 505. However, when an incomplete ATM cell with virtual path/channel information of 3/7 is not stored in the inner transmission SRAM 506, the ATM cell constructing part 508 newly defines the incomplete ATM cell with virtual path/channel information of 3/7 and related parameter values.

Accordingly, the ATM cell constructing part 508 multiplexes into the payload of the ATM cell either the mini-cells read from the external transmission SRAM 505 with the mini-cells being transmitted, or just the mini-cells being transmitted depending upon whether an incomplete ATM cell with virtual path/channel of 3/7 is stored in the inner transmission SRAM 506. As with the previous ATM cell with virtual path/channel of 2/3, the ATM cell constructing part 508 sets the a 512 corresponding to this incomplete ATM cell prior to filling the ATM cell.

Figure 13:
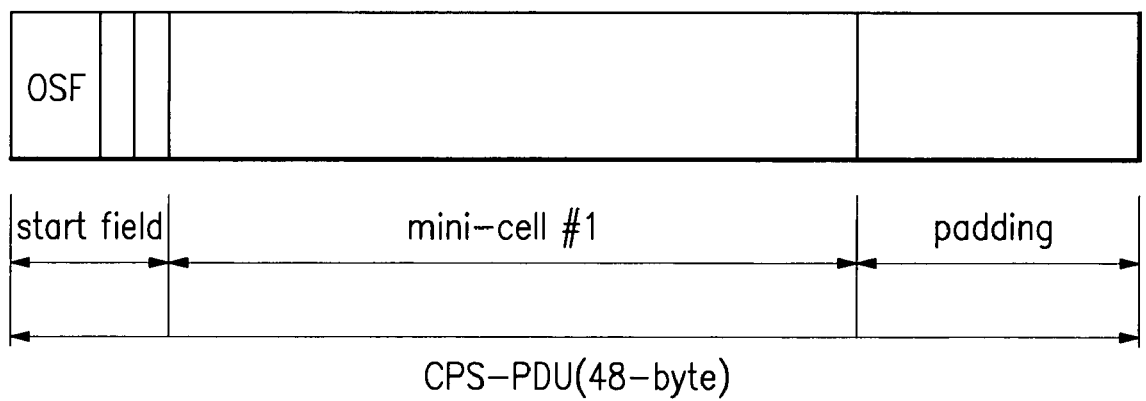
FIG. 13 shows that an ATM cell which is not completely filled with mini-cells is padded with '0'.

Thus, if an ATM cell payload is filled up, the transmission output buffer controller 509 stores the generated ATM cell in the transmission output buffer 510. However, even when an ATM cell payload has not been completely filled, the transmission output buffer controller 509 pads the unfilled portion of the ATM cell payload with '0' as shown in FIG. 13 after a predetermined time set by the timer 512, and then stores the ATM cell in the transmission output buffer 510. This is for the purpose of, even if the 48-byte ATM cell payload is not completely filled with the mini-cells, outputting the ATM cell after the predetermined period of time.

According to the aforementioned procedure, the user data items transmitted from the AAL2 users are multiplexed into the ATM cells each of which has a fixed size, to be output to the transmission output buffer 510, and the header is assigned to each ATM cell stored in the transmission output buffer 510 according to corresponding virtual path/channel information through the ATM layer. Each ATM cell to which the header is assigned is transmitted to a corresponding destination.

FIG. 9 is a block diagram of the AAL2 receiving part of the ALL2 processing apparatus according to the second embodiment of the present invention.

Referring to FIG. 9, the AAL2 receiving part includes a reception input buffer 700 for storing each ATM cell transmitted from the ATM layer; a reception input buffer controller 701 for reading the ATM cell stored in the reception input buffer 700; a mini-cell deconstructing part 702 for demultiplexing the mini-cells in the received ATM cell payload to deconstruct them; a user data constructing part 707 for dividing the each mini-cell deconstructed by the mini-cell deconstructing part 702 into ANP data and user data and assigning routing information (R_Tag) thereto according to channel identifier information (CID) and virtual path/channel information of each mini-cell; a reception output buffer controller 708 for storing each mini-cell, output from the user data constructing part 707, into a reception output buffer 709; an external reception DPRAM 706 for managing a table which stores routing information (R_Tag) according to the virtual path/channel information and channel identifier information (CID) of the received ATM cell; an external reception SRAM 703 for storing a unconstructed mini-cell; an inner reception SRAM 704 for managing the address of the external reception SRAM 703 in which the unconstructed mini-cell is stored; a mini-cell table controller 705 for managing the inner reception SRAM 705; and a status register 710. The operation of the AAL2 receiving part constructed as above is explained below.

First of all, each ATM cell transmitted from the ATM layer is stored in the reception input buffer 700. Then, the reception input buffer controller 701 reads each ATM cell stored in the reception input buffer 700 and transfers it to the mini-cell deconstructing part 702. The mini-cell deconstructing part 702 demultiplexes the mini-cells, multiplexed to be inserted into the payload of each ATM cell, to deconstruct them. Each mini-cell deconstructed is sent to the user data constructing part 707 together with virtual path/channel information thereof. At this time, if one mini-cell is inserted into and received in multiple ATM cells, the mini-cell deconstructing part 702 deconstructs a part of the mini-cell first, stores this portion of the mini-cell which has not been completed in the external reception SRAM 703 together with parameter values related thereto, and then waits for the next ATM cell. Upon arrival of the ATM cells corresponding to the remaining portion of the mini-cell which has not been completed, the mini-cell deconstructing part 702 deconstructs the remaining part, combines it with the mini-cell which has not been complete but stored in the external reception SRAM 703, to accomplish one mini-cell, and then sends it to the user data constructing part 707.

Here, the inner reception SRAM 704 stores address information of the mini-cell which is not completely deconstructed and which is stored in the external reception SRAM 703. The address of this mini-cell is determined according to the virtual path/channel information thereof as shown in FIG. 8B.

Accordingly, upon arrival of each ATM cell, the mini-cell deconstructing part 702 checks if there is a mini-cell which has not been completely deconstructed among the mini-cells of the ATM cell currently stored at the external reception SRAM 703 with reference to the inner reception SRAM 704 by way of the mini-cell table controller 705. When there is a mini-cell which has not been completely deconstructed, the mini-cell deconstructing part 702 reads it from the external reception SRAM 703 and combines it with corresponding mini-cell currently arrived.

The user data constructing part 707 assigns routing information (R_Tag) according to a corresponding destination to each mini-cell sent from the mini-cell deconstructing part 702, to construct data items having two forms, shown in FIGS. 11A and 11B. Here, the routing information (R_Tag) is determined according to the channel identifier information (CID) and virtual path/channel information included in each mini-cell. Furthermore, the user data constructing part 707 constructs the data form shown in FIG. 11A when the mini-cell sent from the mini-cell deconstructing part 702 is ANP data, and constructs the data form shown in FIG. 11B when it is user data. The mini-cell to which the routing information (R_Tag) is assigned by the user data constructing part 707 is then stored in the reception output buffer 708. Subsequently, the reception output buffer controller 709 outputs each mini-cell stored in the reception output buffer 708 to transmit it to a corresponding destination.

As described above, the AAL2 processing apparatus according to the present invention is included in the base station, base station controller and mobile switching center of a mobile communication system, to transmit AAL2 data items of multiple users, transmitted through multiple channels, via plural virtual channels. Accordingly, the accommodation capacity of the mobile communication increases and transmission rate rises, to provide stable communication service. Furthermore, the present invention can be applied to IMT-2000 system, digital cellular network, currently being developed. Moreover, the AAL2 processing apparatus of the present invention has excellent performance in system extension and operation because it can process AAL2 data without limiting virtual paths and virtual channels.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for processing AAL2 supporting multiple virtual channels comprising:

a transmitting part which assigns a corresponding virtual path/channel information of a destination to data from a plurality of AAL2 users, which multiplexes the data having the assigned virtual path/channel information into transmission ATM cells based upon the corresponding assigned virtual path/channel information, and which transmits to the corresponding destination a transmission ATM cell through one of a plurality of channels corresponding to the assigned virtual path/channel information; and a receiving part which receives an ATM cell through one of the plurality of channels, demultiplexes the received ATM cell based upon a corresponding virtual path/channel information assigned to the ATM cell, and transmits the demultiplexed data to corresponding AAL2 users, wherein the transmitting part comprises an AAL2 transmitter which multiplexes the data from the plurality of AAL2 users to generate a CPS-PDU (common part sub layer-protocol data unit), and assigns a routing information to the generated CPS-PDU; and wherein the routing information includes a field indicating whether a CPS-packet length is 53 bytes or 64 bytes, wherein the transmitting part comprises:

a first buffer unit which stores and outputs each of the data from the plurality of AAL2 users as AAL2 user data;

a first memory unit which stores and controls virtual path/channel information and channel identifier information according to the routing information in each AAL2 user data;

a mini-cell constructing part which assigns a channel identifier information from the first memory unit to AAL2 user data and generates mini-cells;

an ATM cell constructing part which multiplexes each mini-cell generated by the mini-cell constructing part into a payload of a transmission ATM cell corresponding to a virtual path/channel information of each respective mini-cell and generates transmission ATM cells corresponding to different virtual path/channel information, wherein said virtual path/channel information is output by the first memory unit;

a second memory unit which stores incomplete transmission ATM cells corresponding to different virtual path/channel information from the ATM cell constructing part; and a transmission output buffer unit which stores and outputs each full transmission ATM cell generated by the ATM cell constructing part through a corresponding channel;

wherein the ATM cell constructing part multiplexes a mini-cell generated by the mini-cell constructing part into a payload of an incomplete transmission ATM cell from the second memory if an incomplete transmission ATM cell corresponding to a virtual path/channel information of the mini-cell is stored in the second memory.

2. The apparatus of claim 1, further comprising a timer which sets a predetermined period for each transmission ATM cell corresponding to different virtual path/channel information before the ATM cell constructing part begins multiplexing mini-cells into each transmission ATM cells; and wherein the transmission output buffer unit stores and outputs an incomplete transmission ATM cell from the second memory if the predetermined period of an incomplete transmission ATM cell has elapsed.

3. The apparatus of claim 1, wherein the first buffer unit comprises:

a transmission input buffer unit which stores the AAL2 user data; and a transmission input buffer controller which reads and outputs the AAL2 user data from the transmission input buffer.

4. The apparatus of claim 1, wherein the first memory unit comprises:

a third memory which stores the virtual path/channel information and channel identifier information according to the routing information in each AAL2 user data; and a transmission table controller which controls and outputs information from the third memory.

5. The apparatus of claim 1, wherein the second memory unit comprises:

a third memory which stores incomplete transmission ATM cells;

a fourth memory which stores a table storing address information of each transmission ATM cells stored in the third memory; and a virtual path/channel table controller which controls input and output of each incomplete transmission ATM cell to and from the third memory according to an address information of each transmission.

6. An apparatus for processing AAL2 supporting multiple virtual channels comprising:

a transmitting part which assigns a corresponding virtual path/channel information of a destination to data from a plurality of AAL2 users, which multiplexes the data having the assigned virtual path/channel information into transmission ATM cells based upon the corresponding assigned virtual path/channel information, and which transmits to the corresponding destination a transmission ATM cell through one of a plurality of channels corresponding to the assigned virtual path/channel information; and a receiving part which receives an ATM cell through one of the plurality of channels, demultiplexes the received ATM cell based upon a corresponding virtual path/channel information assigned to the ATM cell, and transmits the demultiplexed data to corresponding AAL2 users, wherein the transmitting part comprises an AAL2 transmitter which multiplexes the data from the plurality of AAL2 users to generate a CPS-PDU (common part sub layer-protocol data unit), and assigns a routing information to the generated CPS-PDU; and wherein the routing information includes a field indicating whether a CPS-packet length is 53 bytes or 64 bytes, wherein the receiving part comprises:

a first buffer unit which stores each reception ATM cell from the plurality of channels;

a first memory which stores routing information according to a virtual path/channel information and channel identifier information of each respective reception ATM cell;

a mini-cell deconstructing part which demultiplexes mini-cells from a payload of each reception ATM cell;

a second memory unit which stores incomplete mini-cells from the mini-cell deconstructing part;

a user data constructing part which assigns a routing information from the first memory to each complete mini-cell according to a channel identifier information and the virtual path/channel information of each complete mini-cell; and
a reception output buffer unit which stores and transmits each complete mini-cell from the user data constructing part to corresponding AAL2 users;
wherein the mini-cell deconstructing part demultiplexes a mini-cell from a payload of at least one reception ATM cell and from a corresponding incomplete mini-cell stored in the second memory unit if a mini-cell is inserted into payloads of more than one reception ATM cell.

7. The apparatus of claim 6, wherein the first buffer unit comprises:
a reception input buffer which stores each reception ATM cell from the plurality of channels; and
a reception input buffer controller which reads and outputs each reception ATM cell from the reception input buffer.

8. The apparatus of claim 6, wherein the second memory unit comprises:
a third memory which stores each incomplete mini-cell;
a fourth memory which stores addresses of each incomplete mini-cell stored in the third memory; and
a mini-cell table controller which controls input and output of each incomplete mini-cell to and from the third memory according to an address information of each mini-cell stored in the fourth memory.

9. An apparatus for processing AAL2 supporting multiple virtual channels comprising:
a transmitting part which assigns a corresponding virtual path/channel information of a destination to data from a plurality of AAL2 users, which multiplexes the data having the assigned virtual path/channel information into transmission ATM cells based upon the corresponding assigned virtual path/channel information, and which transmits to the corresponding destination a transmission ATM cell through one of a plurality of channels corresponding to the assigned virtual path/channel information; and
a receiving part which receives an ATM cell through one of the plurality of channels, demultiplexes the received ATM cell based upon a corresponding virtual path/channel information assigned to the ATM cell, and transmits the demultiplexed data to corresponding AAL2 users,
wherein the transmitting part comprises an AAL2 transmitter which multiplexes the data from the plurality of AAL2 users to generate a CPS-PDU (common part sub layer-protocol data unit), and assigns a routing information to the generated CPS-PDU; and
wherein the routing information includes a field indicating whether a CPS-packet length is 53 bytes or 64 bytes, wherein the transmitting part comprises:
a first memory which stores CID information assigned to each data from the plurality of AAL2 users;
a second memory which stores the routing information for identifying one of the plurality virtual channels set to a destination of a CPS-PDU; and
a transmission buffer which stores the CPS-PDU from the AAL2 transmitter in one of a first multiple virtual channels identified by the assigned routing information to form and to transmit a transmission ATM cell through the channel identified by the assigned routing information; and wherein the receiving part comprises:
a reception buffer which stores a CPS-PDU from each reception ATM cell received through one of the plurality of channels, the CPS-PDU being stored in a corresponding one of a second multiple virtual channels through which each reception ATM cell is received;
an AAL2 receiver which demultiplexes CPS-PDU from the second buffer based upon a routing information to generate and transmit the demultiplexed data to corresponding AAL2 users based upon a CID information;
a third memory which stores CID information; and
a fourth memory which stores routing information.

10. The apparatus of claim 9, wherein the AAL2 transmitter comprises:
an input buffer controller which receives a CPS-packets from the plurality of AAL2 users;
an AAL2 transmission functioning part which converts the CPS-packets from the input buffer controller into a CPS-PDU; and
an output buffer controller which controls the transmission buffer to transmit the CPS-PDU from the AAL2 transmission functioning part through one of the first multiple virtual channels.

11. The apparatus of claim 9, wherein the AAL2 receiver comprises:
an input buffer controller which receives a CPS-PDU through one of the second multiple virtual channels;
an AAL2 receiver functioning part which converts the CPS-PDU from the input buffer controller to CPS-packets; and
an output buffer controller which transfers the CPS-packets from the AAL2 receiver functioning part to corresponding AAL2 users.

12. A method for processing AAL2 supporting multiple virtual channels comprising:
(a1) assigning a corresponding virtual path/channel information of a destination to data from a plurality of AAL2 users, and multiplexing the data having the assigned virtual path/channel information into transmission ATM cells based upon the corresponding assigned virtual path/channel information, and transmitting to the corresponding destination a transmission AAL2 cell through one of a plurality of channels corresponding to the assigned virtual path/channel information; and
(b1) receiving an ATM cell through one of the plurality of channels, demultiplexing the received ATM cell based upon a corresponding virtual path/channel information assigned to the ATM cell, and transmitting the demultiplexed data to corresponding AAL2 users,
wherein (a1) further comprises multiplexing the data from the plurality of AAL2 users to generate a CPS-PDU (common part sub layer-protocol data unit), and assigning a routing information to the generated CPS-PDU; and
wherein the routing information includes information indicating whether a CPS-packet length is 53 bytes or 64 bytes, wherein (a1) further comprises:
(a2) storing and outputting each of the data from a plurality of AAL2 users as AAL2 user data;
(b2) storing and controlling virtual path/channel information and channel identifier information according to the routing information in each AAL2 user data;
(c2) assigning a channel identifier information from the first memory unit to a user data of the AAL2 data and generating mini-cells;
(d2) multiplexing each generated mini-cell into a payload of a transmission ATM cell corresponding to a virtual path/channel information of each respective mini-cell and generating transmission ATM cells corresponding to different virtual path/channel information;

(e2) storing incomplete transmission ATM cells corresponding to different virtual path/channel information from (d2); and
(f2) storing and outputting each full transmission ATM cells generated in (d2) through a corresponding channel;
wherein in (d2) multiplexing a generated mini-cell into a payload of an incomplete transmission ATM cell from (e2) if an incomplete transmission ATM cell corresponding to a virtual path/channel information of the mini-cell is stored.

13. The method of claim 12, further comprising:
setting a predetermined period for each transmission ATM cell corresponding to different virtual path/channel information before multiplexing mini-cells into each transmission ATM cells in (d2); and in (f2) storing and outputting an incomplete transmission ATM cell from (e2) if the predetermined period of an incomplete transmission ATM cell has elapsed.

14. A method for processing AAL2 supporting multiple virtual channels comprising:
(a1) assigning a corresponding virtual path/channel information of a destination to data from a plurality of AAL2 users and multiplexing the data having the assigned virtual path/channel information into transmission ATM cells based upon the corresponding assigned virtual path/channel information, and transmitting to the corresponding destination a transmission ATM cell through one of a plurality of channels corresponding to the assigned virtual path/channel information; and
(b1) receiving an ATM cell through one of the plurality of channels, demultiplexing the received ATM cell based upon a corresponding virtual path/channel information assigned to the ATM cell, and transmitting the demultiplexed data to corresponding AAL2 users,
wherein (a1) further comprises multiplexing the data from the plurality of AAL2 users to generate a CPS-PDU (common part sub layer-protocol data unit), and assigning a routing information to the generated CPS-PDU; and
wherein the routing information includes information indicating whether a CPS-packet length is 53 bytes or 64 bytes, wherein (b1) further comprises:
(a2) storing each reception ATM cell from the plurality of channels;
(b2) storing routing information according to a virtual path/channel information and channel identifier information of each respective reception ATM cell;
(c2) demultiplexing mini-cells from a payload of each reception ATM cell;
(d2) storing incomplete mini-cells from (c2);
(e2) assigning a routing information from (b2) to each complete mini-cell according to a channel identifier information and the virtual path/channel information of each complete mini-cell; and
(f2) storing and transmitting each complete mini-cell from the user data constructing part to corresponding AAL2 users;
wherein in (c2), demultiplexing a mini-cell from a payload of at least one reception ATM cell and from a corresponding stored incomplete mini-cell if a mini-cell is inserted into payloads of more than one reception ATM cell.

15. A method for processing AAL2 supporting multiple virtual channels comprising:
(a1) assigning a corresponding virtual path/channel information of a destination to data from a plurality of AAL2 users, and multiplexing the data having the assigned virtual path/channel information into transmission ATM cells based upon the corresponding assigned virtual path/channel information, and transmitting to the corresponding destination a transmission ATM cell through one of a plurality of channels corresponding to the assigned virtual path/channel information; and
(b1) receiving an ATM cell through one of the plurality of channels, demultiplexing the received ATM cell based upon a corresponding virtual path/channel information assigned to the ATM cell, and transmitting the demultiplexed data to corresponding AAL2 users,
wherein (a1) further comprises multiplexing the data from the plurality of AAL2 users to generate a CPS-PDU (common part sub layer-protocol data unit), and assigning a routing information to the generated CPS-PDU; and
wherein the routing information includes information indicating whether a CPS-packet length is 53 bytes or 64 bytes, wherein (a1) further comprises:
storing CID information assigned to each data from the plurality of AAL2 users;
storing the routing information for identifying one of the plurality virtual channels set to a destination of a CPS-PDU; and
storing the CPS-PDU in one of a first multiple virtual channels identified by the assigned routing information to form and to transmit a transmission ATM cell through the channel identified by the assigned routing information; and wherein (b1) comprises:
storing a CPS-PDU from each reception ATM cell received through one of the plurality of channels, the CPS-PDU being stored in a corresponding one of a second multiple virtual channels through which each reception ATM cell is received;
demultiplexing a CPS-PDU from the second buffer based upon a routing information to generate and transmit the demultiplexed data to corresponding AAL2 users based upon a CID information; and
storing CID information and routing information.

16. A method for processing AAL2 supporting multiple virtual channels comprising: (a) multiplexing packet data transmitted from at least one AAL2 user to generate protocol data; (b) assigning virtual channel identification information (R_Tag), corresponding to a destination, to the protocol data, and grouping together protocol data having a same virtual channel identification information before transmitting the data to the destination; and (c) transmitting the protocol data through a corresponding virtual channel according to the assigned virtual channel identification information (R_Tag), wherein a predetermined byte having identification information for identifying the virtual channels is additionally assigned to the protocol data, and the identification information indicates whether a CPS-packet length is 53 bytes or a length different than 53 bytes, wherein (a) further comprises: assigning a header to the packet data, said header including CID information, UUI information, and HEC information; and assigning the virtual channel identification information and a start field to the packet data to which the header is assigned, said start field including OSF information, a sequence number of the protocol data, and a parity bit for correcting error.

17. The method of claim 16, wherein the predetermined byte is one-byte.

18. The method of claim 16, wherein (c) further comprises transmitting the protocol data through one of a plurality of buffers which are set corresponding to virtual channels.

19. The method of claim 16, further comprising:
(d) receiving the protocol data by an ATM layer through the virtual channel;
(e) demultiplexing the received protocol data to generate packet data, and dividing the packet data by users or virtual channels; and
(f) transmitting the packet data to an AAL2 user according to a corresponding destination.

20. The method of claim 19, wherein (e) further comprises:
storing the received protocol data in a plurality of reception buffers which are set corresponding to the virtual channels; and
demultiplexing the protocol data, stored in the plural reception buffers, using the identification information for identifying the virtual channels.

21. An apparatus for processing multiple virtual channels comprising:
a transmitting part which assigns a corresponding virtual path/channel information of a destination to data from a plurality of AAL2 users, which multiplexes the data having the assigned virtual path/channel information into transmission ATM cells based upon the corresponding assigned virtual path/channel information, and which transmits to the corresponding destination a transmission ATM cell through one of a plurality of channels corresponding to the assigned virtual path/channel information,
wherein the transmitting part comprises an AAL2 transmitter which multiplexes the data from the plurality of AAL2 users to generate a CPS-PDU (common part sub layer-protocol data unit), and assigns a routing information to the generated CPS-PDU; and
wherein the routing information includes a field indicating whether a CPS-packet length is 53 bytes or a length different than 53 bytes, wherein the transmitting part comprises:
a first buffer unit which stores and outputs each of the data from the plurality of AAL2 users as AAL2 user data;
a first memory unit which stores and controls virtual path/channel information and channel identifier information according to the routing information in each AAL2 user data;
a mini-cell constructing part which assigns a channel identifier information from the first memory unit to AAL2 user data and generates mini-cells;
an ATM cell constructing part which multiplexes each mini-cell generated by the mini-cell constructing part into a payload of a transmission ATM cell corresponding to a virtual path/channel information of each respective mini-cell and generates transmission ATM cells corresponding to different virtual path/channel information, wherein said virtual path/channel information is output by the first memory unit;
a second memory unit which stores incomplete transmission ATM cells corresponding to different virtual path/channel information from the ATM cell constructing part; and
a transmission output buffer unit which stores and outputs each full transmission ATM cell generated by the ATM cell constructing part through a corresponding channel;
wherein the ATM cell constructing part multiplexes a mini-cell generated by the mini-cell constructing part into a payload of an incomplete transmission ATM cell from the second memory if an incomplete transmission ATM cell corresponding to a virtual path/channel information of the mini-cell is stored in the second memory.

22. An apparatus for processing multiple virtual channels comprising:
a receiving part which receives an ATM cell through one of a plurality of channels, demultiplexes the received ATM cell based upon a corresponding virtual path/channel information assigned to the ATM cell, and transmits the demultiplexed data to corresponding AAL2 users,
wherein the receiving part reads a field of the ATM cell to determined whether a (common part sub layer) CPS-packet length is 53 bytes or 64 bytes, and
wherein the receiving part comprises:
a first buffer unit which stores each reception ATM cell from the plurality of channels;
a first memory which stores routing information according to a virtual path/channel information and channel identifier information of each respective reception ATM cell;
a mini-cell deconstructing part which demultiplexes mini-cells from a payload of each reception ATM cell;
a second memory unit which stores incomplete mini-cells from the mini-cell deconstructing part;
a user data constructing part which assigns a routing information from the first memory to each complete mini-cell according to a channel identifier information and the virtual path/channel information of each complete mini-cell; and
a reception output buffer unit which stores and transmits each complete mini-cell from the user data constructing part to corresponding AAL2 users;
wherein the mini-cell deconstructing part demultiplexes a mini-cell from a payload of at least one reception ATM cell and from a corresponding incomplete mini-cell stored in the second memory unit if a mini-cell is inserted into payloads of more than one reception ATM cell.

* * * * *